(12) United States Patent
Pfaff et al.

(10) Patent No.: US 9,483,051 B2
(45) Date of Patent: Nov. 1, 2016

(54) AUTOMATED GUIDED VEHICLE, SYSTEM HAVING A COMPUTER AND AN AUTOMATED GUIDED VEHICLE, AND METHOD FOR OPERATING AN AUTOMATED GUIDED VEHICLE

(71) Applicant: KUKA Laboratories GmbH, Augsburg (DE)

(72) Inventors: Patrick Pfaff, Augsburg (DE); Daniel Meyer-Delius, Munich (DE); Stefan Loibl, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/266,242

(22) Filed: Apr. 30, 2014

(65) Prior Publication Data

US 2014/0324267 A1     Oct. 30, 2014

(30) Foreign Application Priority Data

Apr. 30, 2013   (DE) .......................... 10 2013 207 895

(51) Int. Cl.
| | |
|---|---|
| *G05D 1/00* | (2006.01) |
| *G05D 1/02* | (2006.01) |
| *G06Q 10/04* | (2012.01) |
| *G01C 21/34* | (2006.01) |

(52) U.S. Cl.
CPC ............. *G05D 1/0088* (2013.01); *G01C 21/34* (2013.01); *G05D 1/0217* (2013.01); *G05D 1/0274* (2013.01); *G06Q 10/047* (2013.01); *G05D 2201/0216* (2013.01)

(58) Field of Classification Search
CPC .... G05D 1/00; G05D 1/0088; G05D 1/0217; G05D 1/0274; G05D 2201/0216; G01C 21/00; G01C 21/206; G01C 21/34; G01C 21/3407; G01C 21/3415; G01C 21/343; G01C 21/3446; G01C 21/3453; G06Q 10/047
USPC ....................................................... 701/23, 25
See application file for complete search history.

(56) References Cited

U.S. PATENT DOCUMENTS

| | | | |
|---|---|---|---|
| 8,311,736 B2 * | 11/2012 | Tomobe et al. ............... | 701/450 |
| 2004/0230340 A1 * | 11/2004 | Fukuchi et al. .............. | 700/245 |
| 2005/0256639 A1 * | 11/2005 | Aleksic et al. ............... | 701/210 |
| 2007/0293985 A1 * | 12/2007 | Myeong et al. .............. | 700/245 |

(Continued)

FOREIGN PATENT DOCUMENTS

| | | |
|---|---|---|
| CN | 1800783 A | 7/2006 |
| CN | 101136860 A | 3/2008 |

(Continued)

OTHER PUBLICATIONS

Brooks, Rodney A.; "A Robust Layered Control System for a Mobile Robot"; Sep. 1985; Massachusetts Institute of Technology; A. I. Memo 864.*

(Continued)

*Primary Examiner* — Jerrah Edwards
*Assistant Examiner* — Tamara Weber
(74) *Attorney, Agent, or Firm* — Wood, Herron & Evans, LLP

(57) ABSTRACT

The invention relates to an automated guided vehicle, a system having a computer and an automated guided vehicle, and a method for operating an automated guided vehicle. The automated guided vehicle is to travel along track sections automatically from a start point to an end point.

9 Claims, 3 Drawing Sheets

(56) References Cited

U.S. PATENT DOCUMENTS

| | | | |
|---|---|---|---|
| 2008/0009965 A1* | 1/2008 | Bruemmer et al. | 700/245 |
| 2008/0033633 A1* | 2/2008 | Akiyoshi et al. | 701/201 |
| 2009/0314318 A1* | 12/2009 | Chang | 134/58 R |
| 2010/0063648 A1* | 3/2010 | Anderson | 701/1 |
| 2010/0106298 A1* | 4/2010 | Hernandez et al. | 700/250 |
| 2011/0035087 A1 | 2/2011 | Kim et al. | |
| 2012/0010772 A1* | 1/2012 | Pack et al. | 701/27 |
| 2012/0143372 A1* | 6/2012 | Roh | 700/255 |
| 2013/0226446 A1* | 8/2013 | Nonner | G01C 21/3423 701/400 |
| 2014/0067254 A1* | 3/2014 | Berlingerio | G01C 21/3423 701/410 |
| 2015/0285644 A1* | 10/2015 | Pfaff | G05D 1/0217 701/25 |

FOREIGN PATENT DOCUMENTS

| | | |
|---|---|---|
| CN | 101739817 A | 6/2010 |
| DE | 69415067 T2 | 7/1999 |
| DE | 102010012750 A1 | 9/2011 |
| DE | 102012207269 A1 | 11/2013 |
| EP | 2169502 A1 | 3/2010 |
| EP | 2172825 A1 | 4/2010 |

OTHER PUBLICATIONS

Jae Heon Chung et al.; "Singularity-Free Dynamic Modeling Including Wheel Dynamics for an Omni-Directional Mobile Robot with Three Caster Wheels"; Feb. 2008; International Journal of Control, Automation, and Systems; vol. 6, No. 1, pp. 86-100.*

German Patent Office; Search Report in German Patent Application No. 10 2013 207 895.1 dated Mar. 26, 2014; 5 pages.

Meyer-Delius et al.; Publication entitled "Occupancy Grid Models for Robot Mapping in Changing Environments" dated Jul. 2012; 8 pages.

Miura et al.; Publication entitled "Mobile Robot Motion Planning Considering the Motion Uncertainty of Moving Obstacles" dated Oct. 1999; 6 pages.

Graglia et al.; Publication entitled "Planning Minimum Time Trajectory in the Traversability Space of a Robot" dated Jan. 1987; 7 pages.

European Patent Office; Search Report in European Patent Application No. 14164735.4 dated Oct. 13, 2015; 6 pages.

Chinese Patent Office; Examination Report in Chinese Patent Application No. 201410182490.1 dated May 4, 2016; 25 pages.

* cited by examiner

AUTOMATED GUIDED VEHICLE, SYSTEM HAVING A COMPUTER AND AN AUTOMATED GUIDED VEHICLE, AND METHOD FOR OPERATING AN AUTOMATED GUIDED VEHICLE

TECHNICAL FIELD

The invention relates to an automated guided vehicle, a system having a computer and an automated guided vehicle, and a method for operating an automated guided vehicle.

BACKGROUND

An automated guided vehicle (AGV) is a floor-bound means of conveyance having its own drive, which is automatically controlled and guided without physical contact. Automated guided vehicles travel automatically from a start point to an end point.

SUMMARY

The objective of the invention is to create conditions enabling an automated guided vehicle to travel more quickly from its start point to its end point.

The objective of the invention is attained by means of a method for operating an automated guided vehicle that is configured to travel automatically from a start point to an end point within an environment, wherein the environment comprises intermediate points, and track sections connecting the intermediate points, the start point, and the end point, having the following steps:

a) Providing a graph assigned to the environment, comprising nodes assigned to the intermediate points, a start node assigned to the start point, an end node assigned to the end point, and edges assigned to the corresponding track sections connecting the start node, the end node and the nodes, wherein information regarding the navigability is assigned to each edge, concerning whether the corresponding track section can be travelled at a specific point in time, and the travel time required by the automated guided vehicle for travelling the corresponding track section that can be navigated, b) based on the information assigned to the edges and the current point in time at the start point, calculating a strategy for selecting the track sections along which the automated guided vehicle can to travel automatically in order to arrive at the end point in the quickest manner possible, wherein the strategy comprises data regarding calculated potential arrival times at the corresponding intermediate points and the end point, c) based on the strategy, automatic travelling of the automated guided vehicle from the start point to the corresponding intermediate point, adjacent to the start point, along the corresponding track section, d) based on the current arrival time at the intermediate point adjacent to the start point, and based on the strategy, an automatic travelling of the automated guided vehicle along the corresponding track section to the next intermediate point along the corresponding track section, e) based on the current arrival time at the next intermediate point, and based on the strategy, automatically travelling of the automated guided vehicle to the intermediate point following the next intermediate point, and f) repeating steps d) and e) until the automated guided vehicle arrives at the end point.

The automated guided vehicle can, for example, determine the desired track sections, or intermediate points, respectively, on its own. Another aspect of the invention relates accordingly to an automated guided vehicle, having a vehicle base body, numerous wheels, pivotally supported in relation to the vehicle base body, for moving the automated guided vehicle, at least one drive coupled to at least one of the wheels, for driving the corresponding wheel, and a control device coupled to the at least one drive, wherein the automated guided vehicle is configured to travel automatically from a start point to an end point within an environment, controlled by its control unit, wherein the environment comprises intermediate points, and track sections connecting the intermediate points, the start point and the end point, and the control device is configured to calculate a strategy pursuant to the method according to the invention, according to which the automated guided vehicle travels automatically from the start point to the end point.

The desired track sections, or intermediate points, respectively, can be determined by an external computer, for example. Another aspect of the invention therefore relates to a system, having:

An automated guided vehicle, having a vehicle base body, numerous wheels pivotally mounted in relation to the vehicle base body, for moving the automated guided vehicle, at least one drive coupled to at least one of the wheels, for driving the corresponding wheel, and a control device coupled to the at least one drive, wherein the automated guided vehicle is configured to travel automatically within an environment from a start point to an end point, controlled by means of its control device, wherein the environment comprises intermediate points and track sections connecting the intermediate points, the start point, and the end point, and a computer, which is configured to calculate the strategy pursuant to the method according to the invention, in order that the automated guided vehicle travels automatically from the start point to the end point, and which is configured to transmit, in particular in a wireless manner, information regarding the strategy to the automated guided vehicle.

The automated guided vehicle is, for example, a mobile robot. The automated guided vehicle designed as a mobile robot can comprise a robot arm, having numerous links disposed successively, which are connected by means of joints. The robot arm can, for example, be attached to the vehicle base body. The control device for moving the wheels can also be configured for moving the robot arm.

The automated guided vehicle can preferably be designed as a holonomic, or omnidirectional, automated guided vehicle. In this case, the automated guided vehicle comprises omnidirectional wheels, preferably so-called Mecanum wheels, which are controlled by the control device.

According to the invention, the automated guided vehicle should travel automatically within the environment, e.g. a hall, from a start point to an end point. The environment comprises, aside from the start point and the end point, the intermediate points, which are connected by means of the track sections. During the automatic travel, the automated guided vehicle moves from the start point to the end point via numerous intermediate points and along the corresponding track sections.

According to the invention, the nodes of the graphs are assigned to the intermediate points of the environment, the start node is assigned to the start point, and the end node is assigned to the end point. The edges of the graph are assigned to the individual track sections, and comprise, respectively, information regarding the temporal navigability of the individual track sections, thus, whether the corresponding track section can be travelled at a specific point in time. Furthermore, each edge comprises information regarding the travel time required by the automated guided vehicle for travelling the course of the corresponding navigable track section. The strategy is calculated based on these information. Subsequently, the automated guided vehicle can travel automatically along the corresponding track sections from the start point to the end point.

In order to travel automatically from the start point to the end point, the strategy is first calculated, prior to the travel, based on which the automated guided vehicle travels automatically from the start point to the end point. The strategy is based on the current point in time at the start node, and takes into account the information assigned to the edges. In this manner, for various potential, or calculated, arrival times at various intermediate points, and based on the actual arrival times at the corresponding intermediate points, the next intermediate point can be determined automatically, and travelled to automatically, this intermediate point being the one that can be travelled to most quickly by the automated guided vehicle at the current point in time.

According to one embodiment of the method according to the invention, the vehicle travels along the track sections, controlled, in particular, by means of a control device for the automated guided vehicle, based on a virtual map of the environment. The virtual map is, for example, stored in the control device for the automated guided vehicle, and maps the environment. By way of example, the automated guided vehicle can map the environment during the travel using sensors, and determine its position in the environment based on the virtual map.

According to a preferred embodiment of the method according to the invention, during the automatic travel of the automated guided vehicle, an updated strategy is calculated at least one of the corresponding intermediate points at the current point in time, and based on the information assigned to the edges, regarding along which track section the automated guided vehicle is able to travel automatically most quickly from the current intermediate point to the end point, wherein the updated strategy comprises information regarding calculated potential arrival times at the corresponding intermediate points and the end point. Following this, the automated guided vehicle travels automatically to the end point, based on the updated strategy. The updated strategy is preferably calculated by the automated guided vehicle itself. The updated strategy, however, can also be calculated by a computer. For the calculation of the updated strategy, the current node is basically used as the new start node. According to the invention, the edges comprise the information regarding the navigability, thus, whether at a specific point in time, the corresponding track section can be travelled, thus, in particular, at which points in time during the day the corresponding track section can be travelled. Because time elapses during the travel of the automated guided vehicle, it may be possible that during the travel, other track sections allow for a shorter travel time to the end point than the track sections assigned to the original strategy. Because of the determination of the updated strategy during the travel, it is possible, according to this embodiment, to obtain a shorter travel time for the automated guided vehicle in some cases.

The navigability of the track sections and/or the information regarding the corresponding travel times can, for example, be determined empirically, and/or in the framework of a learning phase. In particular, the navigability of the corresponding track section and/or the information regarding the corresponding travel times can be automatically updated during the automatic travel of the automated guided vehicle.

According to a preferred embodiment on the method according to the invention, the respective information, regarding whether the corresponding track section is navigable at a specific point in time, is provided as a stochastic process describing the navigability of the corresponding track section at specific points in time. The information regarding the corresponding travel times are preferably, in each case, provided as a probability distribution, which is modeled on the estimated travel times required by the automated guided vehicle for navigable track sections. By means of this probability distribution, or stochastic process, respectively, the shortest travel time from the start point to the end point can be mathematically calculated, or estimated, in a relatively simple manner.

Preferably, the travel times that are to be expected for the individual track sections can be calculated, these being calculated, as probability distributions for the arrival times $P(Y_1)$ at the next intermediate point, according to the following formula:

$$P(Y_1) = \sum_{x \in \{0,1\}} P(X_t = x) P(Y_t \mid X_t = x)$$

Where $P(X_t)$ is the probability distribution for the navigability of the track section assigned to the corresponding edge, and $P(Y_t|X_t)$ is the conditional probability for the arrival time for the track section assigned to the corresponding edge, as a function of the navigability.

BRIEF DESCRIPTION OF THE DRAWINGS

An exemplary embodiment of the invention is illustrated by way of example in the attached schematic figures.

DETAILED DESCRIPTION

Figure 1:
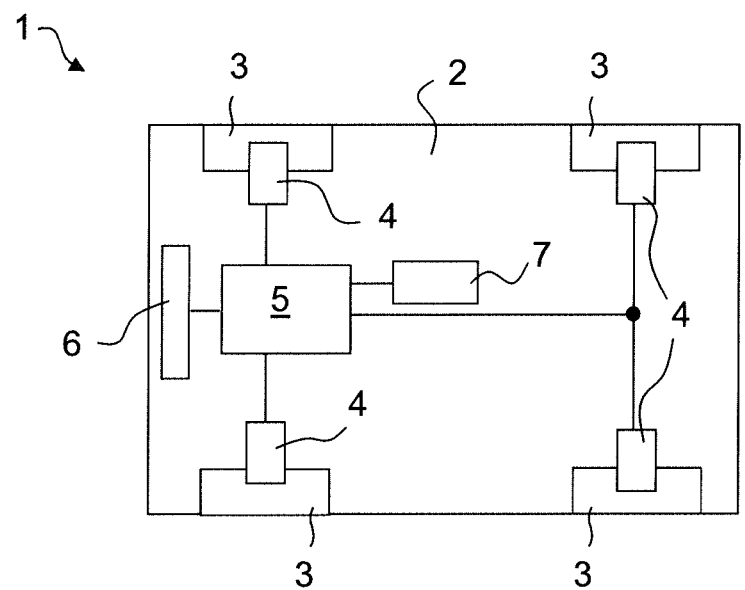
FIG. 1 is a top view of an automated guided vehicle.
Figure 2:
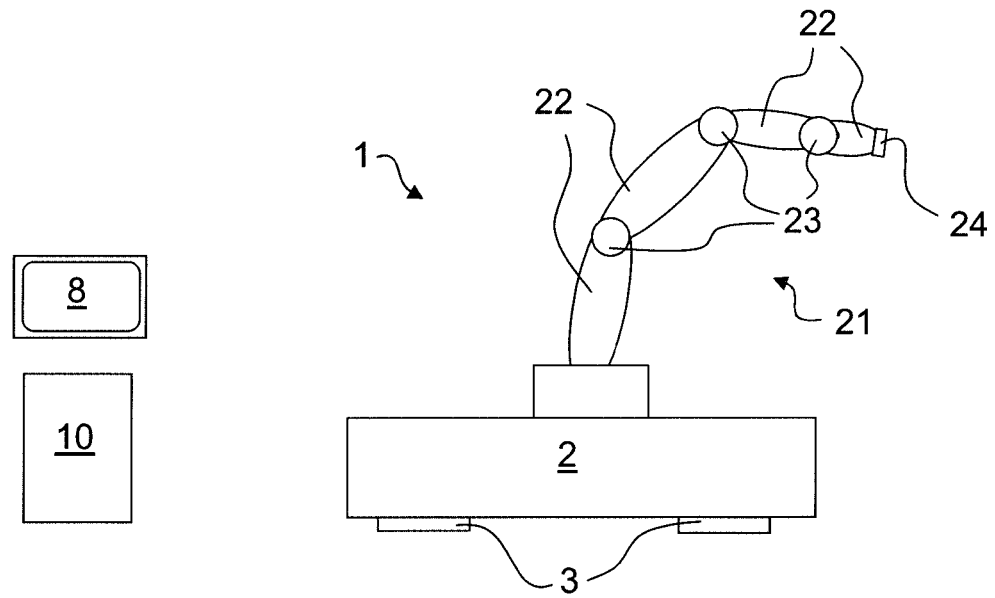
FIG. 2 is a side view of the automated guided vehicle of FIG. 1.

FIG. 1 shows, in a top view, schematically, an automated guided vehicle 1, and FIG. 2 shows a side view of the automated guided vehicle 1.

The automated guided vehicle 1 is preferably designed such that it can move freely in all directions. The automated guided vehicle 1 is, in particular, designed as an omnidirectional moveable, or holonomic, respectively, automated guided vehicle. The automated guided vehicle 1 can be a mobile robot, comprising a robot arm 21, having numerous links 22, disposed successively, which are connected by means of joints 23. The robot arm 21 comprises, in particular, an attachment device, e.g. in the form of a flange 24, to which an end effector, not shown, can be attached.

In the case of the present embodiment example, the automated guided vehicle 1 has a vehicle base body 2, and numerous omnidirectional wheels 3, which can also be referred to as Mecanum wheels. Wheels of this type comprise, for example, a pivotably mounted rim, on which numerous roller elements are supported, without a drive. The rims can be driven by means of a drive. In the case of the present embodiment example, the wheels 3 are each driven by means of an electric drive 4. These are preferably feedback controlled electric drives.

The automated guided vehicle 1 also has a control device 5 disposed on the vehicle base body 2, which is connected to the drives 4. If applicable, this can also control the movement of the robot arm 21, if present.

Figure 3:
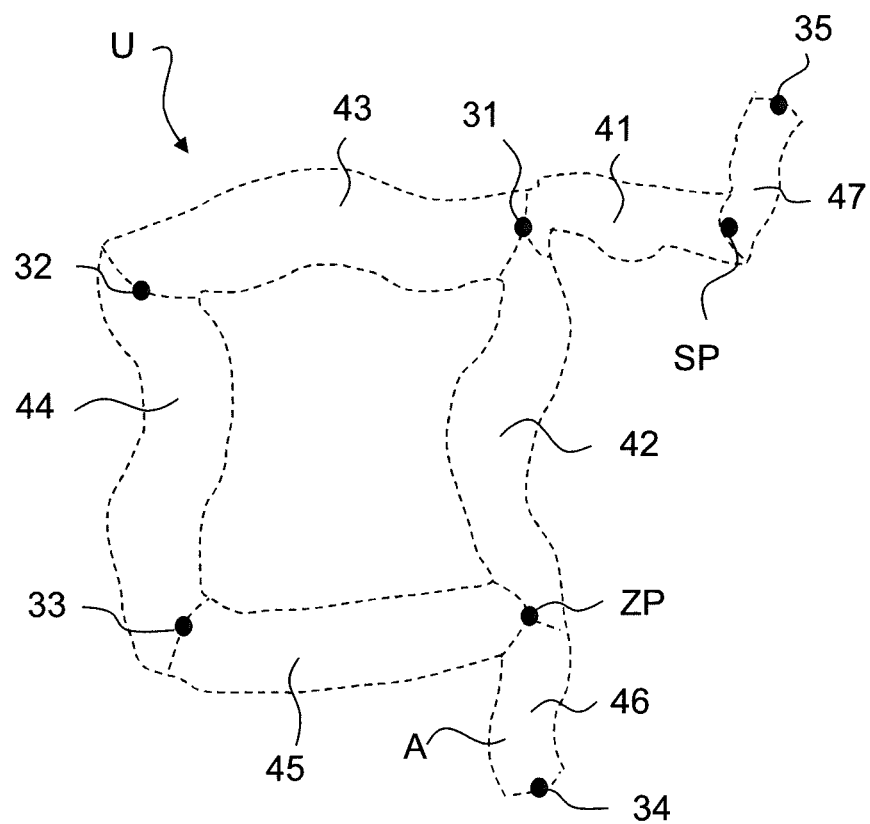
FIG. 3 is an environment for the automated guided vehicle.

The automated guided vehicle 1 is supposed to move automatically in an environment U shown in FIG. 3, in particular, to travel automatically from a start point SP to an end point ZP. For this, a computer program runs on the control device 5, which controls the drives 4 in such a manner that these automatically move the automated guided vehicle 1 from the start point SP to the end point ZP.

In the case of the present embodiment example, not only the start point SP and the end point ZP are assigned to the environment U, but also, numerous intermediate points are assigned thereto. In the case of the present embodiment example, the intermediate points comprise a first intermediate point 31, a second intermediate point 32, a third intermediate point 33, a fourth intermediate point 34, and a fifth intermediate point 35.

The intermediate points 31-35 are connected by means of track sections, on which the automated guided vehicle 1, if applicable, can travel between two intermediate points. FIG. 3 shows a first track section 41, which connects the start point SP to the first intermediate point 31, a second track section 42, which connects the first intermediate point 31 to the end point ZP, a third track section 43, which connects the first intermediate point 31 to the second intermediate point 32, a fourth track section 44, which connects the second intermediate point 32 to the third intermediate point 33, a fifth track section 45, which connects the third intermediate point 33 to the end point ZP, a sixth track section 46, which connects the end point ZP to the fourth intermediate point 34, and a seventh track section 47, which connects the start point SP to the fifth intermediate point 35.

The automated guided vehicle 1 further comprises at least one sensor 6, connected to the control device 5, and, e.g., disposed on the vehicle base body 2. The sensor 6, or sensors, respectively, comprise, e.g., at least one laser scanner and/or at least one camera, and are provided for recording, or scanning, respectively, the environment U of the automated guided vehicle 1 during its automatic travel, or creating images of the environment U of the automated guided vehicle 1, respectively. The control device 5, in turn, is configured to process, or evaluate, respectively, the signals or data arriving from the sensors 6, e.g., by means of image data processing. The at least one sensor 6 comprises, e.g. a 2D laser scanner, a 3D laser scanner, an RGB-D camera, and/or a TOF camera. TOF cameras are 3D camera systems, which measure distances with the time-of-flight method.

As has already been explained, the automated guided vehicle 1 is configured, in the case of the present embodiment example, to travel automatically from the start point SP to the end point ZP within the environment U. For this, in the case of the present embodiment example, e.g., a virtual map 40, shown in FIG. 4, or a digital map, respectively, of the respective environment U in which the automated guided vehicle 1 is to move, is stored in the control device 5. The environment U is, e.g. a hall. The virtual map 40 is created, e.g. by means of a so-called SLAM method, e.g. based on signals, or data, respectively, from the sensors 6 and/or based on wheel sensors, not shown in detail, assigned to the wheels 3. The virtual map 50 is, e.g. stored in a memory 7 of the automated guided vehicle 1, which is coupled to the control device 5. The virtual map 40 can, e.g. be depicted by means of a display device 8. By this means, it is possible for the automated guided vehicle to move automatically to the end point ZP, as soon as it is known to it, along which track sections of the environment U it is to travel automatically to the end point ZP.

Figure 4:
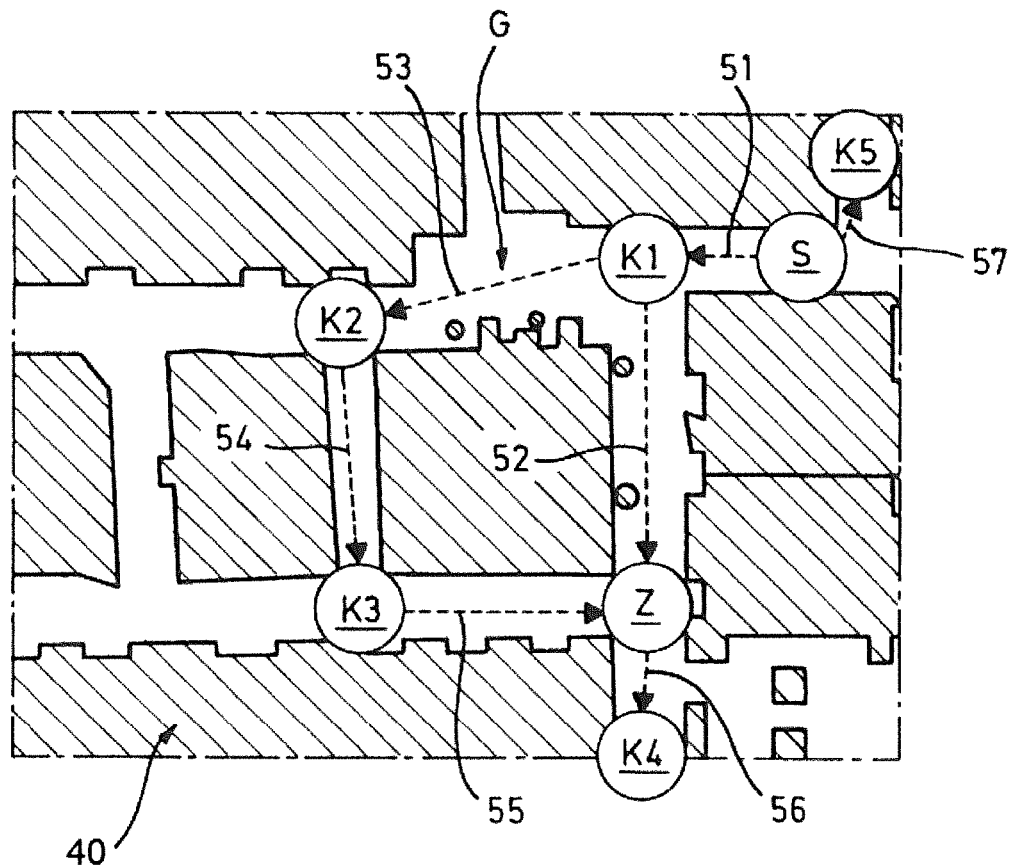
FIG. 4 is a virtual map and a graph.
Figure 5:
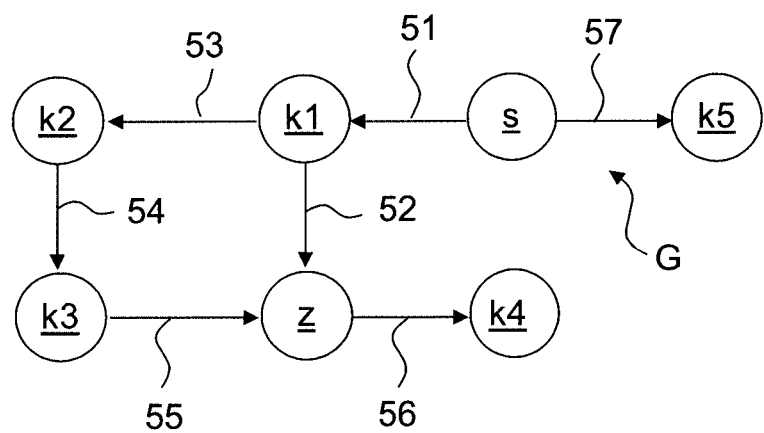
FIG. 5 is the graph depicted in FIG. 4.

In the case of the present embodiment example, the track sections that are to be travelled are determined using a graph G shown in FIGS. 4 and 5. In particular, the track sections are determined based on a potentially changing environment U, which can change in that, among other things, at least one of the track sections is not always navigable, and in that the time required by the automated guided vehicle 1 for travelling the course of a specific track section in the environment U can change. This planning is executed, e.g., by the automated guided vehicle 1 itself, e.g. by means of its control device 5, or a computer program, respectively, running on its control device 5. The planning can, however, e.g. also be executed by means of an external computer 10, or a computer program, respectively, running on the computer 10, wherein the computer 10 preferably transmits the results of the planning to the control computer 5 in a wireless manner. The graph G can, e.g., be depicted together with the virtual map 40 on the display device 8, as is illustrated in FIG. 4.

The graph G comprises numerous nodes, and edges connecting the nodes. The graph G comprises, in particular, a start node s, an end node z, a first node k1, a second node k2, a third node k3, a fourth node k4, and a fifth node k5. The graph G comprises, in particular, a first edge 51, a second edge 52, a third edge 53, a fourth edge 54, a fifth edge 55, a sixth edge 56, and a seventh edge 57. In the case of the present embodiment example, the first edge 51 connects the start node s to the first node k1, the second pathway 52 connects the first node k1 to the end node z, the third edge 53 connects the first node k1 to the second node k2, the fourth edge 54 connects the second node k2 to the third node k3, the fifth edge 55 connects the third node k3 to the end node z, the sixth edge 56 connects the end nod z to the fourth node k4, and the seventh edge 57 connects the start node s to the fifth node k5.

In the case of the present embodiment example, the start point SP in the environment U is assigned to the start node s on the graph G, and the end point ZP is assigned to the end node z. Furthermore, the intermediate points 31-35 in the environment U are assigned to the nodes k1-k5 of the graph G, and the track sections 41-47 are assigned to the edges 51-57. In particular, the first intermediate point 31 in the environment U is assigned to the first node k1 of the graph G, the second intermediate point 32 in the environment U is assigned to the second node k2 of the graph G, the third intermediate point 33 in the environment U is assigned to the third node k3 of the graph G, the fourth intermediate point 34 in the environment U is assigned to the fourth node k4 of the graph G, and the fifth intermediate point 35 in the environment U is assigned to the fifth node k5 of the graph G. In particular, the first track section 41 is assigned to the first edge 51, the second track section 42 is assigned to the second edge 52, the third track section 43 is assigned to the third edge 53, the fourth track section 44 is assigned to the fourth edge 54, the fifth track section 45 is assigned to the fifth edge 55, the sixth track section 46 is assigned to the sixth edge 56, and the seventh track section 47 is assigned to the seventh edge 57.

The graph G is, in particular, a directed graph G, for which reason the edges 51-57 are depicted as arrows in FIGS. 4 and 5. The graph G can be described mathematically by means of the following equation:

$$G = \langle V, E \rangle$$

where V is a finite quantity of nodes s, z, k1-k5, and $E \subseteq V \times V$ is the set of edges 51-57.

In the case of the present embodiment example, each individual edge 41-47 is assigned information regarding the track section 51-57 to which it is assigned.

In the case of the present embodiment example, the information regarding the corresponding track section 51-57 comprises a navigability of the corresponding edge 51-57, or the corresponding track section 41-47, respectively, thus information regarding whether the automated guided vehicle 1 can travel on the corresponding track section at a specific point in time, and the travel time required by the automated guided vehicle 1 to travel the corresponding navigable track section.

In the case of the present embodiment example, a stochastic process is assigned to each of the edges 51-57, which describes the navigability of the corresponding track section 41-47 at specific points in time, and a probability distribution, modeling the probable travel time required by the automated guided vehicle 1 for navigable track sections 41-47.

The planning of the track sections that are to be travelled is executed by means of the graph G. In the framework of the planning, a strategy is calculated, regarding along which track sections 41-47 the automated guided vehicle 1 is able to automatically travel to the end point ZP most quickly. The strategy comprises information regarding calculated potential arrival times at the corresponding intermediate points 31-35, and the end point ZP. The planning can be repeated during the travel of the automated guided vehicle 1 to at least one of the intermediate points 31-35, through which the automated guided vehicle 1 passes during its travel, wherein this intermediate point then represents a new start point for the updated planning. When the planning is repeated, an updated strategy is calculated, according to which the automated guided vehicle 1 travels automatically from the current intermediate point to the end point ZP.

The planning of the track sections that are to be travelled can preferably viewed as a Markov decision process, in which $$S = \{(i,t) | i \in V, t \in N_0\}$$

is the state space assigned to the start point SP, the intermediate points 31-35, and the end point ZP, or, respectively, the start node s, the end node z and the intermediate nodes k1-k5, and the arrival time at the corresponding intermediate points 31-35, or the end point ZP, respectively.

$A(i, t) = N_G(i)$ is the activity space that is assigned in the graph G for each state $(i, t) \in S$, wherein $N_G(i)$ is the set of all neighboring nodes i, i.e. the nodes k1-k5, the start node s and the end node z.

$P((j, t')|(i, j), j)$ is a navigability model, or a navigability probability, to which a probability is assigned for the arrival of the automated guided vehicle 1 at the j-th intermediate point at time t', if it has started travelling from the i-th intermediate point at time t. This probability is a function of the navigability of the track sections 41-47 assigned to the corresponding edges (i, j) (edges 51-57), and the probability distribution, which models the probable travel time required for the automated guided vehicle 1 on the navigable track section. The present Markov decision process is, in particular, a so-called left-right model, because none of the transitions in states, the assigned arrival times of which can be less than or equal to the current state, are possible.

An average cost function is indicated by c: $S \times S \rightarrow N_0 \cup \{\infty\}$, to which the time required by the automated guided vehicle 1 to travel from one state to another, thus from one intermediate point to the next, is assigned. If the corresponding navigability probability is zero, then the cost function is set at "infinite."

With the given end node z ($z \in G$), an optimal strategy $\pi^*$ can be calculated, which minimizes the expected arrival time at the end point ZP for each state s. The minimum expected arrival time $C^*(i, t)$ for each state $(i, t) \in S$ can be calculated with the following equation (equation no. 1):

$$C*(i, t) = \min_{j \in A(i,t)} \sum_{t'=t+1}^{\infty} C*(j, t') P((j, t') | (i, t), j)$$

The target state (z, t) assigned to the end node z is initialized, in particular, with t, i.e. $C^*(z, t) = t$.

In order to obtain a relatively efficient calculation of the arrival time, in particular, preferably by means of a dynamic calculation, in the case of the present embodiment example, the fact that a point in time $t_m$ exists is exploited, such that $C^*(i, t_m + t) = C^*(i, t_m) + t$ for all $t \in N_0$. This means that for all time steps greater than $t_m$, the time required for reaching the end point ZP is not dependent on the current point in time.

$X_t$ is a random variable, describing the navigability of a specific edge 51-57, or its assigned track section 41-47 at the point in time t, wherein $$X_t = \begin{cases} 0, & \text{if the corresponding pathway at point in time } t \text{ is navigable} \\ 1, & \text{if the corresponding pathway at point in time } t \text{ is not navigable} \end{cases}$$

In the case of the present embodiment example, this probability for the individual points in time is determined empirically. It is, however, also possible for this probability to be determined automatically, by means of the automated guided vehicle 1, in that, e.g., during a learning phase, it automatically travels through the environment, and stores information thereby for the individual points in time regarding when which track section is navigable. This learning phase can also occur, at least in part, during the running operation, in order, e.g., to improve the information regarding said probability. The learning phase can occur in its entirety during the running operation.

In the case of the present embodiment example, it is assumed that the navigability probability for a specific edge, or its assigned track section, respectively, is independent of the navigability probability of the remaining edges, or their assigned track sections. Furthermore, in the case of the present embodiment example, a homogenous Markov process of the first degree, having a navigability matrix $$A = \begin{bmatrix} p_{00} & p_{01} \\ p_{10} & p_{11} \end{bmatrix}$$

is assumed.

If t approaches "infinity," $X_t$ approaches a stationary distribution. The time required for this approaching is referred to as a combined time. The combined time for the entire graph G is:

$$t_m = \max\{t_m^e | e \in E\}, \text{ wherein } t_m^e$$

is the combined time for the respective edges 51-57.

In the case of the present embodiment example, the expected travel times through corresponding track sections 41-47, assigned to the edges 51-57, are modeled as a stochastic process $Y_t$, which expresses the probability that the automated guided vehicle 1 will reach the next intermediate point at a specific point in time. In particular, $P(Y_t=t')$ is the probability that the automated guided vehicle 1 will arrive at the j-th intermediate point at the point in time t', when it leaves the i-th intermediate point (which can also be the start point SP) at the point in time t. The probability distribution for the arrival time $P(Y_t)$ can be calculated as follows:

$$P(Y_t) = \sum_{x \in \{0,1\}} P(X_t = x) P(Y_t | X_t = x)$$

wherein $P(X_t)$ is the probability distribution for the navigability of the track section assigned to the corresponding edge, and $P(Y_t|X_t)$ is the conditional probability for the arrival time of the track section assigned to the corresponding edge, as a function of the navigability. In the case of the present embodiment example, $Y_t$-t is the travel time assigned to the track section.

The travel time is time dependent, if the corresponding track section is navigable. In the case of the present embodiment example, the so-called discrete approaching of the beta distribution can be used to calculate the conditional arrival time, i.e.

$$P(Y_t|X_t=0) \sim \text{Beta}(\alpha,\beta;a+t,b+1).$$

If a track section cannot be travelled on, then for the present example embodiment, the distribution of the arrival time is given as:

$$P(Y_t | X_t = 1) = \sum_{n=0}^{\infty} (P_{11})^n P_{10} P(Y_{t+n+1} | X_t) = 0$$

In the case of the present embodiment example, it is assumed that the state of an edge, or its track section, respectively, must change before the intermediate point assigned to the next node can be reached. The expected arrival time assigned to a pathway at the point in time t is obtained by $$E[Y_t] = E[Y_t | X_t = 0] + \frac{P(X_t = 1)}{1 - p_{11}}$$

wherein $E[Y_t|X_t=0]$ is the expected arrival time assigned to an edge, if this edge is navigable, and $$\frac{P(X_t = 1)}{1 - p_{11}}$$

is the expected time step, or elapsed time, respectively, during which the automated guided vehicle 1 must presumably wait at a node, or intermediate point, respectively, until the subsequent edge, or the subsequent track section is again navigable.

Thus, the arrival time probability distribution assigned to the pathway specific edge is expressed as $$P((j,t')|(i,j),j) = P(Y_t' = t').$$

In order to obtain the minimum expected arrival time $C^*(i, t)$ for each of the states $(i, t) \in S$, in the case of the present embodiment example, the minimum expected arrival time $C^*(i, t_m)$ is calculated for each state at the point in time $t_m$, by means of the following formula:

$$C*(i, t_m) = \min_{j \in A(i,t)} \sum_{t'=t+1}^{\infty} (C*(j, t_m) + t) P(Y_{t_m} = 1).$$

This equation is obtained through the use of equation no. 1. Through conversion, the following is obtained:

$$C*(i, t_m) = \min_{j \in A(i,t)} C*(j, t_m) + E[Y_{t_m}].$$

As already described above, for the end point ZP, thus for the end node z, the following is obtained: $C^*(j, t_m) = t_m$. By way of example, by means of Dijkstra's algorithm, known in principle to the person skilled in the art, the expected arrival time at the end point ZP can be calculated for all intermediate nodes k1-k5 at the point in time $t_m$, in that, in the case of the present embodiment example, the expected travel time $E[Y_{t_m}] - t_m$ at the point in time $t_m$ can be used for the cost function for each edge 51-57.

Assuming that the expected arrival time at the point in time $t=t_m$ has already been calculated, the expected arrival times for $t<t_m$ can be calculated according to the equation no. 1, e.g. by means of iteration, starting with the point in time $t_m-1$.

In particular, for each state (i, t) in S, only those expected arrival times for the time steps greater than t are needed, which have either already been calculated, or can be calculated according to $C^*(i, t_{m+1}) = C^*(i, t_m) + t$.

The value for the equation no. 1 can, e.g., be calculated according to the following equation:

$$C*(i, t) = A + B = \min_{j \in A(i,t)} \sum_{t'=t+1}^{T} C*(j, t') P(Y_t = t') + \sum_{t'=T+1}^{\infty} C*(j, t') P(Y_t = t')$$

wherein the time step T is the maximum between $t_m$ and t*+1, wherein t* is the greatest value with regard to $P(Y_t|X_t=0)$.

For the summands A, the minimum expected arrival times have already been calculated. The summand B can be calculated by means of the following equation:

$$B = P(X_t = 1) P(Y_t = t^* + 1 | X_t = 1)$$

$$\frac{p_{11}^{T-t^*}}{1 - p_{11}} \cdot \left(C*(j, t_m) + T + 1 + t - t_m + \frac{p_{11}}{1 - p_{11}}\right).$$

What is claimed is:

1. A method for operating an automated guided vehicle within an environment, which is configured to travel automatically from a start point to an end point, wherein the environment comprises intermediate points and track sections connecting the intermediate points, the start point, and the end point, the method comprising:
   a) providing a graph assigned to the environment, the graph comprising intermediate nodes assigned to the intermediate points, a start node assigned to the start point, an end node assigned to the end point, and edges assigned to the track sections connecting the start node, the end node, and the intermediate nodes, wherein information is assigned to the edges in each case, regarding the navigability of whether the corresponding track section can be travelled at a specific point in time and the travel time required by the automated guided vehicle for travelling the course of the corresponding navigable track section,
   b) based on the information assigned to the edges and the current point in time at the start point, calculating a strategy for determining the track sections along which the automated guided vehicle can travel most quickly in an automated manner to the end point, wherein the strategy comprises information regarding calculated potential arrival times at the corresponding intermediate points and the end point,
   c) based on the strategy, automatically moving the automated guided vehicle from the start point to the corresponding intermediate point adjacent to the start point, along the corresponding track section,
   d) based on the current arrival time at the intermediate point adjacent to the start point, and based on the strategy, automatically moving the automated guided vehicle to the next intermediate point along the corresponding track section,
   e) based on the current arrival time at the next intermediate point, and based on the strategy, automatically moving the automated guided vehicle along the corresponding track section to the intermediate point, following the next intermediate point, and
   f) repeating steps d) and e) until the automated guided vehicle arrives at the end point;
   wherein the respective information regarding whether the corresponding track section is navigable at a specific point in time is implemented as a stochastic process describing the navigability of the corresponding track sections at specific points in time, and
   the information regarding the corresponding travel times are each implemented as a probability distribution, which provides a model of the expected travel time required by the automated guided vehicle on navigable track sections.

2. The method of claim 1, further comprising, during the automatic movement of the automated guided vehicle along the determined track sections, calculating at least one updated strategy at one of the corresponding intermediate points at the current point in time, and based on the information assigned to the edges, determining the track sections along which the automated guided vehicle can most quickly travel from the current intermediate point to the end point, wherein the updated strategy comprises information regarding calculated potential arrival times at the corresponding intermediate points and the end point, and automatically moving the automated guided vehicle to the end point, based on the updated strategy.

3. The method of claim 1, in which the navigability of the corresponding track section and/or the information regarding the corresponding travel time are determined empirically and/or in the framework of a learning phase.

4. The method of claim 3, in which the navigability of the corresponding track section and/or the information regarding the corresponding travel times is automatically updated during the automatic movement of the automated guided vehicle.

5. The method of claim 1, wherein automatically moving the automated guided vehicle comprises controlling the automated guided vehicle to move along the track sections based on a virtual map of the environment.

6. The method of claim 5, wherein controlling the automated guided vehicle to move along the track sections is carried out by a control device for the automated guided vehicle.

7. The method of claim 1, in which the expected travel times are calculated for the individual track sections, which are calculated as probability distributions for the arrival times $P(Y_t)$ at the next intermediate point according to the following formula:

$$P(Y_t) = \sum_{x \in \{0,1\}} P(X_t = x) P(Y_t \mid X_t = x)$$

wherein $P(X_t)$ is the probability distribution for the navigability of the track section assigned to the corresponding edge, and $P(Y_t|X_t)$ is the conditional probability for the arrival time of the track section assigned to the corresponding edge, as a function of the navigability.

8. An automated guided vehicle, comprising:
   a vehicle base body,
   a plurality of wheels pivotally supported in relation to the vehicle base body for moving the automated guided vehicle,
   at least one drive coupled to at least one of the wheels for driving the corresponding wheel, and
   a control device coupled to the at least one drive,
   wherein the automated guided vehicle is configured to travel automatically, controlled by means of its control device, within an environment, from a start point to an end point, and
   wherein the environment comprises intermediate points and track sections connecting the intermediate points, the start point, and the end point, and the control device is configured to calculate a strategy according to which the automated guided vehicle travels automatically from the start point to the end point, whereby the control device includes a program code stored in a non-transitory storage medium, the program code, when executed by the control device, configured to:
   a) reference a graph assigned to the environment, the graph comprising intermediate nodes assigned to the intermediate points, a start node assigned to the start point, an end node assigned to the end point, and edges assigned to the track sections connecting the start node, the end node, and the intermediate nodes, wherein information is assigned to the edges in each case, regarding the navigability of whether the corresponding track section can be travelled at a specific point in time and the travel time required by the automated guided vehicle for travelling the course of the corresponding navigable track section, b) based on the information assigned to the edges and the current point in time at the start point, calculate a strategy for determining the track sections along which the automated guided vehicle can travel most quickly in an automated manner to the end point, wherein the strategy comprises information regarding calculated potential arrival times at the corresponding intermediate points and the end point, c) based on the strategy, automatically move the automated guided vehicle from the start point to the corresponding intermediate point adjacent to the start point, along the corresponding track section, d) based on the current arrival time at the intermediate point adjacent to the start point, and based on the strategy, automatically move the automated guided vehicle to the next intermediate point along the corresponding track section, e) based on the current arrival time at the next intermediate point, and based on the strategy, automatically move the automated guided vehicle along the corresponding track section to the intermediate point, following the next intermediate point, and f) repeat steps d) and e) until the automated guided vehicle arrives at the end point;

wherein the respective information regarding whether the corresponding track section is navigable at a specific point in time is implemented as a stochastic process describing the navigability of the corresponding track sections at specific points in time, and the information regarding the corresponding travel times are each implemented as a probability distribution, which provides a model of the expected travel time required by the automated guided vehicle on navigable track sections.

9. A system, comprising:

an automated guided vehicle, having a vehicle base body, numerous wheels, pivotally supported in relation to the vehicle base body, for moving the automated guided vehicle, at least one drive coupled to at least one of the wheels, for driving the corresponding wheel, and a control device coupled to the at least one drive, wherein the automated guided vehicle is configured to travel, controlled by its control device, automatically, within an environment, from a start point to an end point, wherein the environment comprises intermediate points and track sections connecting the intermediate points, the start point and the end point, and a computer, which is configured to determine a strategy according to which the automated guided vehicle travels automatically from the start point to the end point, and which is configured, in particular, to wirelessly transmit information regarding the strategy to the automated guided vehicle, whereby the computer includes a program code stored in a non-transitory storage medium, the program code, when executed by the computer, configured to:

a) reference a graph assigned to the environment, the graph comprising intermediate nodes assigned to the intermediate points, a start node assigned to the start point, an end node assigned to the end point, and edges assigned to the track sections connecting the start node, the end node, and the intermediate nodes, wherein information is assigned to the edges in each case, regarding the navigability of whether the corresponding track section can be travelled at a specific point in time and the travel time required by the automated guided vehicle for travelling the course of the corresponding navigable track section, b) based on the information assigned to the edges and the current point in time at the start point, calculate a strategy for determining the track sections along which the automated guided vehicle can travel most quickly in an automated manner to the end point, wherein the strategy comprises information regarding calculated potential arrival times at the corresponding intermediate points and the end point, c) based on the strategy, automatically move the automated guided vehicle from the start point to the corresponding intermediate point adjacent to the start point, along the corresponding track section, d) based on the current arrival time at the intermediate point adjacent to the start point, and based on the strategy, automatically move the automated guided vehicle to the next intermediate point along the corresponding track section, e) based on the current arrival time at the next intermediate point, and based on the strategy, automatically move the automated guided vehicle along the corresponding track section to the intermediate point, following the next intermediate point, and f) repeat steps d) and e) until the automated guided vehicle arrives at the end point;

wherein the respective information regarding whether the corresponding track section is navigable at a specific point in time is implemented as a stochastic process describing the navigability of the corresponding track sections at specific points in time, and the information regarding the corresponding travel times are each implemented as a probability distribution, which provides a model of the expected travel time required by the automated guided vehicle on navigable track sections.

* * * * *